US012704957B2

(12) United States Patent
Yoshida et al.

(10) Patent No.: US 12,704,957 B2
(45) Date of Patent: Aug. 11, 2026

(54) DATA RECORDING APPARATUS, DATA RECORDING METHOD, AND NON-TRANSITORY COMPUTER READABLE MEDIUM

(71) Applicant: Yokogawa Electric Corporation, Tokyo (JP)

(72) Inventors: Yoshitaka Yoshida, Tokyo (JP); Nobuaki Ema, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 33 days.

(21) Appl. No.: 18/297,643

(22) Filed: Apr. 10, 2023

(65) Prior Publication Data

US 2023/0376203 A1 Nov. 23, 2023

(30) Foreign Application Priority Data

May 18, 2022 (JP) ................................ 2022-081836

(51) Int. Cl.
*G06F 3/06* (2006.01)
*H03M 7/30* (2006.01)

(52) U.S. Cl.
CPC .......... *G06F 3/0608* (2013.01); *G06F 3/0659* (2013.01); *G06F 3/0673* (2013.01)

(58) Field of Classification Search
CPC .... G06F 3/0608; G06F 3/0659; G06F 3/0673; G06F 3/0638; G06F 3/0613; H03M 7/3059; H03M 7/6029; H03M 7/30
USPC .................................................. 711/154, 103
See application file for complete search history.

(56) References Cited

U.S. PATENT DOCUMENTS

| | | | | |
|---|---|---|---|---|
| 7,009,533 | B1 | 3/2006 | Wegener | |
| 2013/0297575 | A1* | 11/2013 | Fallon | H03M 7/4043 707/693 |
| 2017/0026054 | A1* | 1/2017 | Nagata | G06F 17/40 |
| 2017/0046074 | A1* | 2/2017 | Wang | G06F 3/0608 |
| 2017/0242806 | A1* | 8/2017 | Solbach | G06F 3/0656 |

(Continued)

FOREIGN PATENT DOCUMENTS

| | | |
|---|---|---|
| JP | 2021144629 A | 9/2021 |
| JP | 2021162459 A | 10/2021 |

OTHER PUBLICATIONS

Extended European Search Report for counterpart European Application No. 23165066.4, issued by the European Patent Office on Sep. 29, 2023.

(Continued)

*Primary Examiner* — Hashem Farrokh

(57) ABSTRACT

A data recording apparatus, including: a data obtaining section for obtaining multiple sets of measurement data obtained by measuring a measurement target; a determining section for determining for every measurement data of the multiple sets of measurement data whether a data volume is reducible; a data volume reducing section for reducing, in response to a result of the determining, a data volume for measurement data of which data volume has been determined as being reducible; a data compressing section for compressing multiple sets of measurement data including the measurement data of which data volume has been reduced; and a data recording section for recording the multiple sets of measurement data which have been compressed, is provided.

18 Claims, 6 Drawing Sheets

(56) References Cited

U.S. PATENT DOCUMENTS

| | | | | |
|---|---|---|---|---|
| 2018/0144621 | A1* | 5/2018 | Arai | G08G 1/0133 |
| 2019/0095350 | A1* | 3/2019 | Durham | G06F 12/145 |
| 2020/0301595 | A1* | 9/2020 | Akutsu | G06F 3/0605 |
| 2021/0081313 | A1* | 3/2021 | Jang | G06F 12/0246 |
| 2021/0286519 | A1 | 9/2021 | Ema | |
| 2021/0305998 | A1 | 9/2021 | Ema | |

OTHER PUBLICATIONS

Office Action issued for counterpart European Application No. 23165066.4, issued by the European Patent Office on Mar. 18, 2024.
Anonymous, "Deflate", Wikipedia, https://en.wikipedia.org/w/index.php?title=Deflate&oldid=1085529224, May 1, 2022, pp. 1-8, Internet.
Office Action issued for counterpart Japanese Application No. 2022-081836, transmitted from the Japanese Patent Office on Dec. 3, 2024 (drafted on Nov. 25, 2024).

* cited by examiner

| TIME | T1 | T2 | T3 | T4 | T5 | T6 | T7 | T8 | T9 | T10 | T11 | T12 | T13 | T14 |
|---|---|---|---|---|---|---|---|---|---|---|---|---|---|---|
| SENSOR A | X | X | X | X | X | X | X | X | X | Y | Y | Y | Z | Z |
| SENSOR B | OFF | OFF | OFF | ON | ON | ON | ON | ON | ON | ON | ON | ON | ON | ON |
| SENSOR C | 1 | 6 | 12 | 12 | 12 | 12 | 13 | 12 | 12 | 12 | 16 | 20 | 24 | 28 |
| SENSOR D | 1.3 | 1.3 | 1.3 | 1.3 | 1.3 | 1.3 | 1.3 | 1.3 | 1.4 | 1.8 | 1.8 | 1.8 | 1.8 | 1.8 |
| SENSOR E | 13.88 | 13.92 | 13.92 | 13.92 | 13.93 | 13.88 | 13.89 | 13.89 | 15.03 | 19.29 | 19.31 | 19.34 | 50.43 | 71.92 |

FIG.2

DATA RECORDING APPARATUS, DATA RECORDING METHOD, AND NON-TRANSITORY COMPUTER READABLE MEDIUM

The contents of the following Japanese patent application (s) are incorporated herein by reference:
NO. 2022-081836 filed in JP on May 18, 2022

BACKGROUND

1. Technical Field

The present invention relates to a data recording apparatus, a data recording method, and a non-transitory computer readable medium.

2. Related Art

Patent Document 1 describes that 'after a part of the measurement data is deleted for reducing a data volume, data compression is performed on this measurement data.'

PRIOR ART DOCUMENT

Patent Document

Patent Document 1: Japanese Patent Application Publication No. 2021-162459

SUMMARY

A first aspect of the present invention provides a data recording apparatus. The data recording apparatus includes: a data obtaining section for obtaining multiple sets of measurement data obtained by measuring a measurement target; a determining section for determining for every measurement data of the multiple sets of measurement data whether a data volume is reducible; a data volume reducing section for reducing, in response to a result of the determining, a data volume for measurement data of which data volume has been determined as being reducible; a data compressing section for compressing multiple sets of measurement data including the measurement data of which data volume has been reduced; and a data recording section for recording the multiple sets of measurement data which have been compressed.

The data recording apparatus further includes an assigning section for assigning identification information representing whether a data volume is reducible to every measurement data of the multiple sets of measurement data, and the determining section may determine for every measurement data whether the data volume is reducible in accordance with the identification information.

In the data recording apparatus, the assigning section may assign the identification information to every measurement data in response to a user input.

In any one data recording apparatus being the data recording apparatus, the determining section may determine for every measurement data whether the data volume is reducible based on time at which the measurement target is measured.

In any one data recording apparatus being the data recording apparatus, the determining section may determine for every measurement data whether the data volume is reducible based on a changed amount in time series.

In any one data recording apparatus being the data recording apparatus, the determining section may determine for every measurement data whether the data volume is reducible based on a prediction error obtained by predicting target measurement data by using another measurement data.

Any one data recording apparatus being the data recording apparatus may further include a trigger judging section for judging if there is a trigger for starting data volume reduction processing on the multiple sets of measurement data.

In the data recording apparatus, the trigger may be set in response to an instruction from an outside.

In any one data recording apparatus being the data recording apparatus, the trigger may be set in response to a fact that a predetermined time has passed.

In any one data recording apparatus being the data recording apparatus, the trigger may be set in response to a fact that a remaining recordable capacity does not satisfy a predetermined criteria.

In any one data recording apparatus being the data recording apparatus, the data volume reducing section may reduce at least one of a number of samples per unit time or a data size per piece of data, for measurement data of which data volume has been determined as being reducible.

In any one data recording apparatus being the data recording apparatus, the data compressing section may compress the multiple sets of measurement data in a reversible way.

Any one data recording apparatus being the data recording apparatus may further include a notifying section for providing an alert notice when there is no measurement data of which data volume is reducible.

Any one data recording apparatus being the data recording apparatus may further include a data transmitting section for transmitting transmission target measurement data among the multiple sets of measurement data to another apparatus.

In the data recording apparatus, the determining section may determine for every measurement data whether the data volume is reducible based on a transmission history of transmission to the another apparatus.

A second aspect of the present invention provides a data recording method. The data recording method executed by a computer, including the computer to perform operations comprising: obtaining multiple sets of measurement data obtained by measuring a measurement target; determining for every measurement data of the multiple sets of measurement data whether a data volume is reducible; reducing, in response to a result of the determining, a data volume for measurement data of which data volume has been determined as being reducible; compressing multiple sets of measurement data including the measurement data of which data volume has been reduced; and recording the multiple sets of measurement data which have been compressed.

A third aspect of the present invention provides a non-transitory computer readable medium having recorded thereon a data recording program. The data recording program is executed by a computer, and causes the computer to function as: a data obtaining section for obtaining multiple sets of measurement data obtained by measuring a measurement target; a determining section for determining for every measurement data of the multiple sets of measurement data whether a data volume is reducible; a data volume reducing section for reducing, in response to a result of the determining, a data volume for measurement data of which data volume has been determined as being reducible; a data compressing section for compressing multiple sets of measurement data including the measurement data of which data volume has been reduced; and a data recording section for recording the multiple sets of measurement data which have been compressed.

The summary clause does not necessarily describe all necessary features of the embodiments of the present invention. The present invention may also be a sub-combination of these features described above.

BRIEF DESCRIPTION OF THE DRAWINGS

FIG. 2 illustrates examples of multiple sets of measurement data which may be obtained by the data recording apparatus 100 according to the present embodiment.

DESCRIPTION OF EXEMPLARY EMBODIMENTS

Hereinafter, embodiments of the present invention will be described. However, the following embodiments do not limit the invention according to the claims. In addition, some combinations of features described in the embodiment may not be essential to the solving means of the invention.

Figure 1:
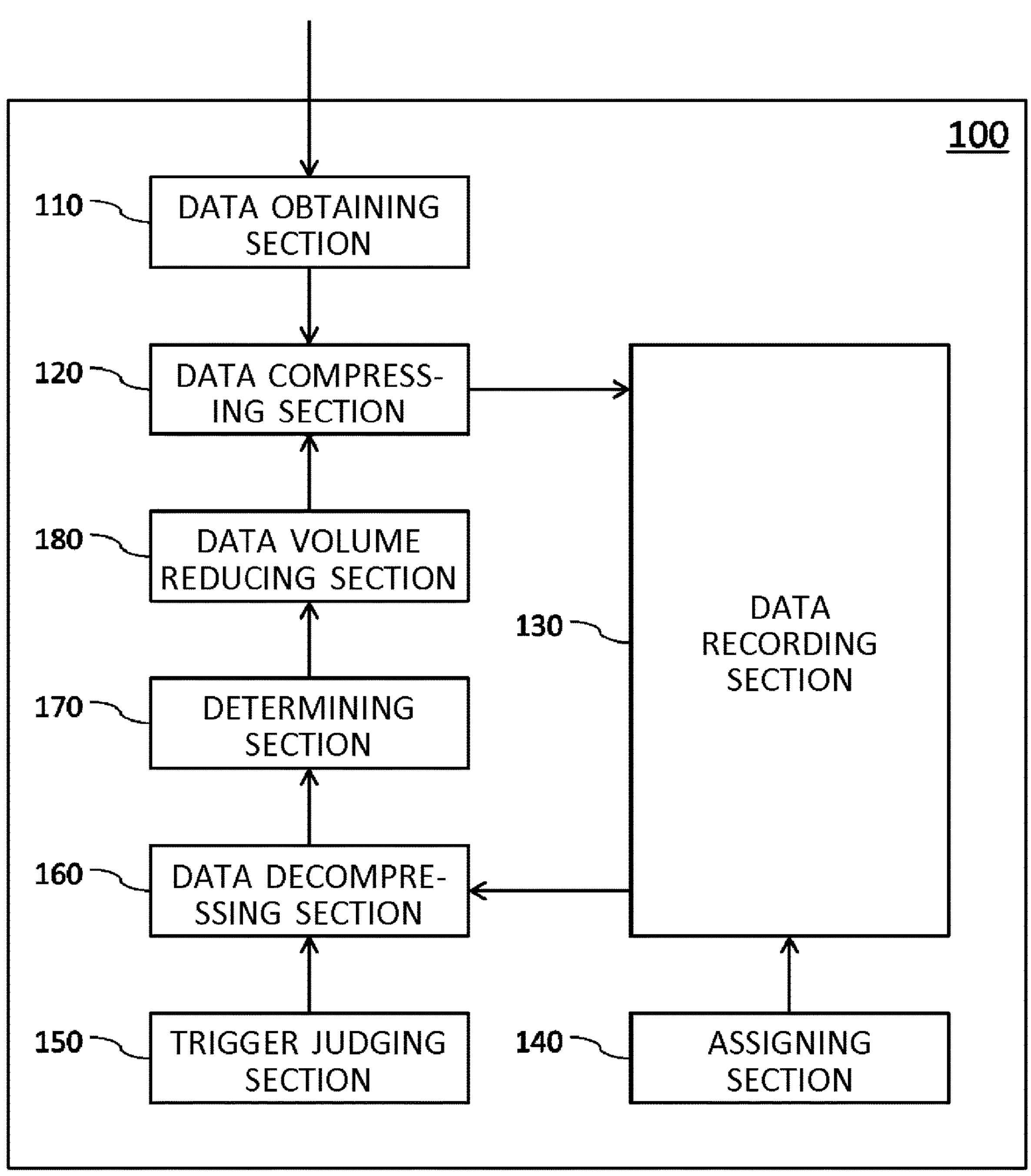
FIG. 1 illustrates one example of a block diagram of a data recording apparatus 100 according to the present embodiment.

FIG. 1 illustrates one example of a block diagram of a data recording apparatus 100 according to the present embodiment. The data recording apparatus 100 obtains and records multiple sets of measurement data obtained by measuring a measurement target. At this time, the data recording apparatus 100 determines for every measurement data whether a data volume is reducible, and reduces a data volume for measurement data of which data volume has been determined as being reducible, and compresses multiple sets of measurement data including this measurement data.

The data recording apparatus 100 may be a computer such as a personal computer (PC), a tablet computer, a smartphone, a workstation, a server computer, or a general-purpose computer, or may also be a computer system to which a plurality of computers is connected. Such a computer system is also considered as a computer in a broad sense. The data recording apparatus 100 may be implemented in a virtual computer environment in which one or more pieces of data recording apparatus 100 can be executed in a computer. Instead of this, the data recording apparatus 100 may be a dedicated purpose computer designed for recording data, or dedicated hardware embodied by a dedicated circuit. If it is possible to connect to the Internet, the data recording apparatus 100 may be embodied by cloud computing.

The data recording apparatus 100 includes a data obtaining section 110, a data compressing section 120, a data recording section 130, a determining section 170, and a data volume reducing section 180. The data recording apparatus 100 may further include an assigning section 140, a trigger judging section 150, and a data decompressing section 160. Noted that, these blocks are functional blocks that are functionally separated from each other, and may not necessarily be identical to actual device structure. That is, in this drawing, even if a unit is shown with one block, the unit may not necessarily be formed by one device. Also, in this drawing, even if units are shown with separate blocks, the units may not necessarily be formed by separate devices. The same applies to the following block diagrams.

The data obtaining section 110 obtains multiple sets of measurement data obtained by measuring a measurement target. The data obtaining section 110 supplies the data compressing section 120 with the obtained multiple sets of measurement data.

The data compressing section 120 compresses the multiple sets of measurement data obtained by the data obtaining section 110. Also, the data compressing section 120 compresses multiple sets of measurement data including the measurement data of which data volume has been reduced by the data volume reducing section 180 described below. The data compressing section 120 supplies the data recording section 130 with the compressed multiple sets of measurement data (also called as 'compressed data').

The data recording section 130 records the multiple sets of measurement data compressed by the data compressing section 120.

The assigning section 140 assigns identification information representing whether a data volume is reducible to every measurement data of the multiple sets of measurement data recorded in the data recording section 130.

The trigger judging section 150 judges if there is a trigger for starting data volume reduction processing on the multiple sets of measurement data recorded in the data recording section 130. If the trigger judging section 150 judges that there is the trigger, then the trigger judging section 150 notifies the data decompressing section 160 of this fact.

The data decompressing section 160 decompresses, in response to a notice from the trigger judging section 150, the multiple sets of measurement data recorded in the data recording section 130, that is, the multiple sets of measurement data compressed by the data compressing section 120. The data decompressing section 160 supplies the determining section 170 with the decompressed multiple sets of measurement data.

The determining section 170 determines for every measurement data of the multiple sets of measurement data decompressed by the data decompressing section 160, whether a data volume is reducible. The determining section 170 supplies the data volume reducing section 180 with the multiple sets of measurement data together with a result obtained by determining for the every measurement data.

The data volume reducing section 180 reduces, depending on the result obtained from the determining by the determining section 170, a data volume for the measurement data of which data volume has been determined as being reducible. Then, the data volume reducing section 180 supplies the data compressing section 120 with the measurement data of which data volume is reduced. On the other hand, for the measurement data of which data volume is determined as not being reducible, the data volume reducing section 180 supplies the data compressing section 120 with the measurement data as it is without reducing its data volume.

In response to this, the data compressing section 120 compresses the multiple sets of measurement data supplied from the data volume reducing section 180. That is, the data compressing section 120 compresses the multiple sets of measurement data including the measurement data of which data volume has been reduced by the data volume reducing section 180. Then, the data recording section 130 records (i.e., overwrites) this compressed multiple sets of measurement data.

Described below in detail are operations of a data recording apparatus 100 that can include such functional sections.

FIG. 2 illustrates examples of multiple sets of measurement data which can be obtained by the data recording apparatus 100 according to the present embodiment. This drawing shows a case by way of example, in which the data recording apparatus 100 obtains the multiple sets of measurement data from five sensors of a sensor A, a sensor B, a sensor C, a sensor D, and a sensor E which have measured a measurement target. However, the present invention shall not be limited to this case. The data recording apparatus 100 can obtain multiple sets of measurement data from more than five sensors, or can obtain multiple sets of measurement data from one or less than five sensors.

Here, types of physical quantities measured by multiple sensors may be the same as each other. That is, all of the sensors from the sensor A to sensor E may be able to measure the physical quantities of the same type. Instead of this, types of physical quantities measured by multiple sensors may be partially or completely different from each other. That is, some sensor(s) among the sensor A to sensor E can be able to measure a physical quantity of a type different from that of others, or all of the sensor A to sensor E can be able to measure physical quantities of types different from each other.

This drawing shows multiple sets of measurement data in time series, which is obtained from the sensor A, sensor B, sensor C, sensor D, and sensor E and shown in this order from top to bottom, with columns representing time. Note that, this time represents time at which each of the sensors have measured a measurement target. In addition, this drawing shows a case by way of example, in which the data recording apparatus 100 obtains measurement data measured by all of the sensors synchronized with each other with regard to time. However, the present invention shall not be limited to this case. The data recording apparatus 100 can obtain measurement data measured by at least some of the multiple sensors unsynchronized with others with regard to time.

Measurement data obtained from the sensor A may indicate a plurality of states (X, Y, and Z) of the measurement target, for example. Measurement data obtained from the sensor B may indicate ON/OFF of a switch of the measurement target, for example. Measurement data obtained from the sensor C may indicate a measurement value obtained by measuring any physical quantity of the measurement target, which is expressed with an integer, for example. Measurement data obtained from the sensor D may indicate a measurement value obtained by measuring any physical quantity of the measurement target, which is expressed to the first decimal place, for example. Measurement data obtained from the sensor E may indicate a measurement value obtained by measuring any physical quantity of the measurement target, which is expressed to the second decimal place, for example.

The data recording apparatus 100 according to the present embodiment obtains and records such multiple sets of measurement data, for example. At this time, the data recording apparatus 100 according to the present embodiment determines for every measurement data whether a data volume is reducible, and reduces a data volume for measurement data of which data volume has been determined as being reducible, and compresses multiple sets of measurement data including this measurement data. This will be described below in detail by using a flowchart.

Figure 3:
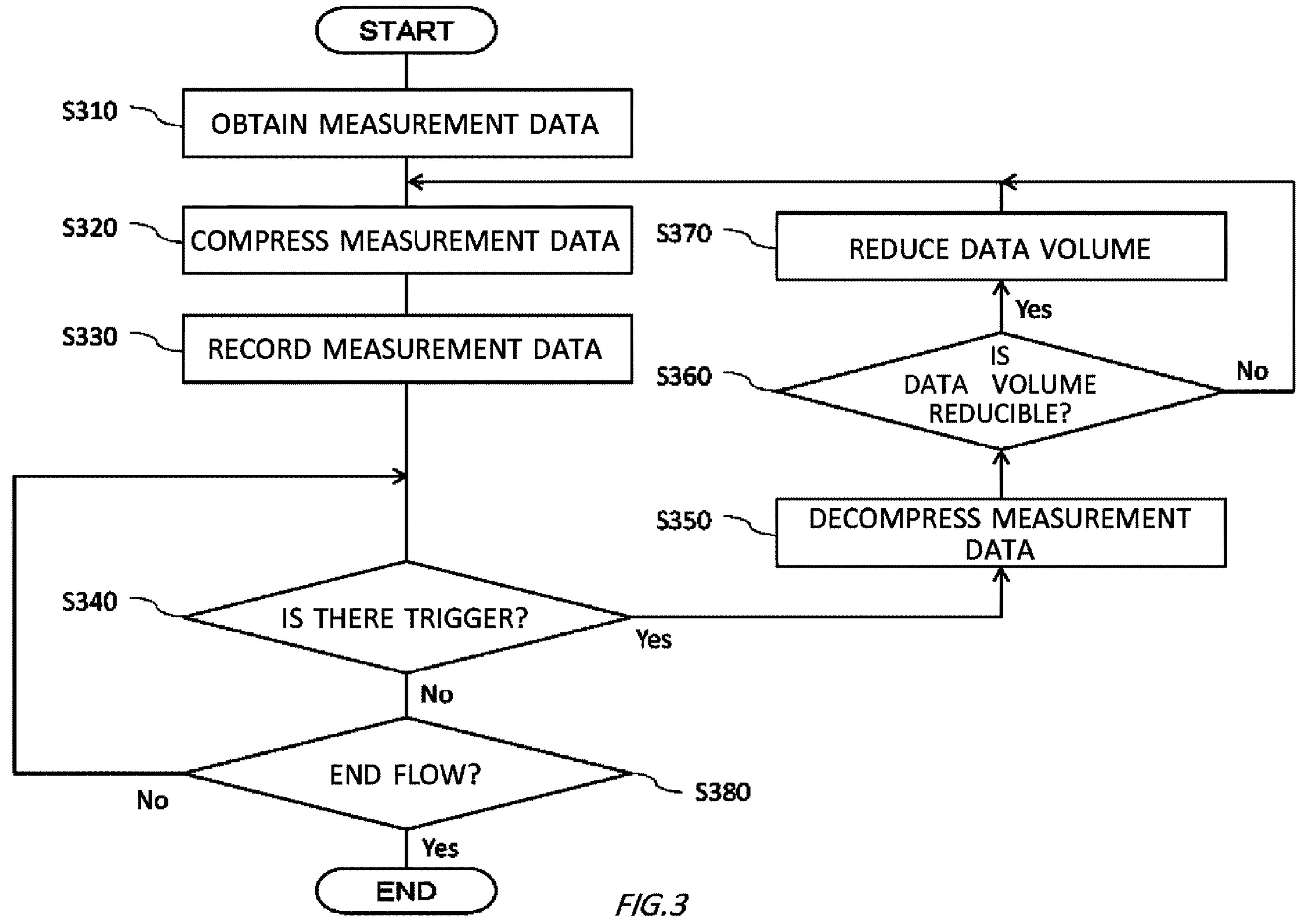
FIG. 3 illustrates one example of a flowchart of a data recording method performed by the data recording apparatus 100 according to the present embodiment.

FIG. 3 illustrates one example of a flowchart of a data recording method performed by the data recording apparatus 100 according to the present embodiment.

In step S310, the data recording apparatus 100 obtains measurement data. For example, the data obtaining section 110 obtains multiple sets of measurement data obtained by measuring a measurement target from multiple sensors via a communication network.

Such communication network may be a network for connecting a plurality of computers. For example, the communication network may be a global network interconnecting a plurality of computer networks, by way of example, the communication network may be the Internet using the Internet Protocol, or the like. Instead of this, the communication network may be formed by a dedicated line. That is, the data obtaining section 110 can directly or indirectly communicate with a mobile phone, a smartphone, a fourth generation (4G) terminal, a fifth generation (5G) terminal etc., and thereby obtain the multiple sets of measurement data.

A case has been described above as one example in which the data obtaining section 110 obtains the multiple sets of measurement data via the communication network. However, the present invention shall not be limited to this case. The data obtaining section 110 may obtain multiple sets of measurement data via another means different from the communication network, such as a user input or a variety of memory devices, for example.

Here, each of the multiple sensors can obtain measurement data taken by measuring a measurement target. For example, such multiple sensors may be sensors installed in the Operational Technology (OT) region, such as sensors for process control (measurement), or Internet of Things (IoT) sensors. By way of example, the multiple sensors may be Industrial sensors connected to one or more field instruments provided in a plant, or integrally formed with the one or more field instruments.

Here, such a plant may be, for example, besides an industrial plant such as a chemical plant, a plant for managing/controlling a wellhead of a gas field, an oil field, etc., or its surroundings, a plant for managing/controlling power generation such as hydraulic power generation, thermal power generation and nuclear power generation, a plant for managing/controlling energy harvesting such as solar photovoltaic power generation, wind power generation, and a plant for managing/controlling water and sewerage services, a dam, etc.

In addition, the field instrument provided in such a plant may be, for example, a pressure gauge, a flow meter, a sensor device such as a temperature sensor, a valve device such as a flow rate controlling valve or an on/off valve, an actuator device such as a fan or a motor, an image capturing device such as a camera or a video camera for capturing a situation or an object in the plant, an audio device such as a microphone, a speaker, etc. for collecting noise etc. in the plant or generating an alarm sound etc., and a position detecting device for outputting positional information of each device.

Therefore, the data obtaining section 110 may obtain measurement data measured by the sensor itself, or measurement data measured inside the field instrument, such as a temperature, pressure, flow rate, acceleration, magnetic field, position, camera image, ON/OFF data of a switch, sound, and a combination thereof. In addition, the data obtaining section 110 may obtain as the measurement data, a value created by using a mathematical formula based on these data.

For example, the data obtaining section 110 obtains such time series data shown in FIG. 2 as the multiple sets of measurement data. By way of example, the data obtaining section 110 obtains time series data 'X, X, X, X, X, X, X, X, X, Y, Y, Y, Z, Z' as the measurement data of the sensor A from time T1 to time T14. The data obtaining section 110 obtains from the other sensors in a way similar to that above. The data obtaining section 110 supplies the data compressing section 120 with the obtained multiple sets of measurement data.

In step S320, the data recording apparatus 100 compresses measurement data. For example, in step S320 following step S310, the data compressing section 120 compresses the multiple sets of measurement data obtained in step S310. Also, in step S320 following step S370 to be described below, the data compressing section 120 compresses multiple sets of measurement data including measurement data of which data volume has been reduced in step S370. At this time, the data compressing section 120 may compress the multiple sets of measurement data in a reversible way (i.e., lossless compression).

Here, lossless compression is a data compression method with which data before compression and data on which processing of compression and decompression (also called as 'uncompression' or 'unzip/unRAR') is performed become completely identical. The lossless compression is called by this name since input data before compression is restored completely. Run Length Encoding (RLE) is included as an algorithm of such lossless compression, for example. Run Length Encoding is an algorithm for compressing data by representing a sequence of data as a single data value and its number of consecutive times of occurrence. Hereinafter, a case in which the data compressing section 120 uses the Run Length Encoding as a compression algorithm will be described, by way of example. However, the present invention shall not be limited to this case. The data compressing section 120 can use other compression algorithms different from the Run Length Encoding, such as Huffman coding and Lempel-Ziv-Welch (LZW).

By way of example, the data compressing section 120 may perform the Run Length Encoding on time series data 'X, X, X, X, X, X, X, X, X, Y, Y, Y, Z, Z' obtained as measurement data of the sensor A, and compress this time series data into compressed data '"X"9, "Y"3, "Z2"'. This means that "X" appears nine times in a row, followed by "Y" that appears three times in a row, and then followed by "Z" that appears twice in a row. The data compressing section 120 compresses data of the other sensors in a way similar to that above. In this way, the data compressing section 120 compresses multiple sets of measurement data, and supplies the data recording section 130 with the compressed data, for example.

In step S330, the data recording apparatus 100 records measurement data. For example, the data recording section 130 records the multiple sets of measurement data compressed in step S320 for every sensor.

In step S340, the data recording apparatus 100 judges if there is a trigger. For example, the trigger judging section 150 judges if there is a trigger for starting data volume reduction processing on the multiple sets of measurement data recorded in step S330.

Such a trigger may be set in response to an instruction from an outside. For example, the trigger may be set through a user input. That is, a user may set the trigger through the user input if the user wants to start the data volume reduction processing, for example. Instead of this or in addition to this, a trigger may be set in response to a message from another apparatus. That is, the another apparatus may set the trigger, when the another device determines that it is preferable to start data volume reduction processing in response to an analyzation result etc. for example, by transmitting the message to the data recording apparatus 100.

Also, such a trigger may be set in response to a fact that a predetermined time has passed. At this time, a point of time when the measurement data is recorded may be used as a starting point of the passage of time. That is, the data recording apparatus 100 may start a timer at a point of time when the multiple sets of measurement data is recorded in step S330, and set the trigger when this timer reaches a predetermined time. Instead of this or in addition to this, a point of time when the measurement data is last accessed may be used as the starting point of the passage of time. That is, the data recording apparatus 100 may start a timer at a point of time when the multiple sets of measurement data is recorded in step S330, and reset this timer every time when the recorded multiple sets of measurement data is accessed. Then, the data recording apparatus 100 may set a trigger when this timer reaches the predetermined time.

Further, such a trigger may be set in response to a fact that a remaining recordable capacity does not satisfy a predetermined criteria. For example, the data recording apparatus 100 may deduct a total capacity of the multiple sets of measurement data recorded in step S330 from all capacities of recordable measurement data, and thereby calculate the remaining recordable capacity of the measurement data. Then, the data recording apparatus 100 may set a trigger when this remaining capacity does not satisfy the predetermined criteria.

If it is judged that there is the trigger (i.e., Yes) in step S340, the trigger judging section 150 notifies the data decompressing section 160 of this fact. Then, the data recording apparatus 100 causes the processing to proceed to step S350.

In step S350, the data recording apparatus 100 decompresses the measurement data. For example, when the data decompressing section 160 receives the notice from the trigger judging section 150 in step S340, the data decompressing section 160 accesses the data recording section 130 and read out the multiple sets of measurement data recorded in step S330, that is, the compressed data compressed in step S320. Then, the data decompressing section 160 decompresses the compressed data by using an algorithm corresponding to the compression algorithm used in step S320. In this manner, the data decompressing section 160 restores the measurement data before it was compressed in step S320. By way of example, the data decompressing section 160 decompresses the compressed data '"X"9, "Y"3, "Z2"' of the sensor A into time series data 'X, X, X, X, X, X, X, X, X, Y, Y, Y, Z, Z'. The data decompressing section 160 decompresses data of the other sensors in a way similar to that above. The data decompressing section 160 supplies the determining section 170 with the decompressed multiple sets of measurement data.

In step S360, the data recording apparatus 100 determines for every measurement data whether a data volume is reducible. For example, the determining section 170 determines for every measurement data of the multiple sets of measurement data decompressed in step S350 whether a data volume is reducible.

At this time, the determining section 170 may determine for the every measurement data whether a data volume is reducible in accordance with identification information assigned by the assigning section 140. At this time, the assigning section 140 may assign such identification information to the every measurement data in response to a user input.

By way of example, assuming that a user has acknowledged that the measurement data for the sensor A in some period (for example, the period in which its state is X) has low recording priority (that is, reducing this measurement data will be no problem). In this case, the user may assign identification information (for example, a flag) representing that a data volume is reducible to the measurement data of the sensor A from time T1 to time T9 through the user input. In this way, the identification information may be assigned to measurement data of any sensor in some period. In this case, the determining section 170 may determine that a data volume for the measurement data of the sensor A from time T1 to time T9 is reducible in accordance with this identification information.

In addition, assuming that the user has acknowledged that the measurement data for the sensor B in all periods has low recording priority. In this case, the user may assign identification information representing that a data volume is reducible to the measurement data of the sensor B from time T1 to time T14 through the user input. In this way, the identification information may be assigned to measurement data of any sensor in all periods. In this case, the determining section 170 may determine that a data volume of the measurement data for the sensor B from time T1 to time T14 is reducible in accordance with this identification information.

Note that, described above is one example of a case in which the determining section 170 determines whether a data volume is reducible in accordance with the identification information. However, the present invention shall not be limited to this case. The determining section 170 may determine for every measurement data whether a data volume is reducible, based on time at which a measurement target is measured. By way of example, assuming that it is predefined that the measurement data of the all sensors has low recording priority for a period from time T1 to time T3. In this case, the determining section 170 may determine that data volumes are reducible for the measurement data for the sensors A, B, C, D, and E from time T1 to time T3.

In addition, the determining section 170 may determine for every measurement data whether a data volume is reducible based on a changed amount in time series. By way of example, assuming that it is predefined that an allowable range of a rate of change from a previous measurement value for the sensor C is 10% or less (0.9≤current value/previous value≤1.1). Here, when focusing on time T4, because the current value (i.e., the measurement value at time T4)=12, and the previous value (i.e., the measurement value at time T3)=12, the rate of change obtained by dividing the current value by the previous value is one, which is within the allowable range. Therefore, the determining section 170 may determine that a data volume of the measurement data for the sensor C at time T4 is reducible. On the other hand, when focusing on time T11, because the current value (i.e., the measurement value at time T11)=16, and the previous value (i.e. the measurement value at time T10)=12, the rate of change obtained by dividing the current value by the previous value is 1.33 . . . , which is outside the allowable range. Therefore, the determining section 170 may determine that a data volume of the measurement data for the sensor C at time T11 is not reducible. In this way, the determining section 170 may determine that data volumes of the measurement data for the sensor C from time T4 to time T10 is reducible, for example.

In addition, the determining section 170 may determine for every measurement data whether a data volume is reducible, based on a prediction error obtained by predicting target measurement data by using another measurement data. By way of example, assuming that it is predefined that an allowable range of a prediction error for sensor E obtained by predicting measurement data by using another measurement data is 1% or less (0.99≤prediction value/measurement value≤1.01). Here, assuming that the measurement data obtained from the sensor E is roughly predictable by using the measurement data obtained from the sensor D (for example, a prediction value of the sensor E=the measurement value of the sensor D×regression coefficient (=10.7)). Here, when focusing on time T1, because the measurement value=13.88, and the prediction value=1.3×10.7=13.91, the prediction error obtained by dividing the prediction value by the measurement value is 1.00216 . . . , which is within the allowable range. Therefore, the determining section 170 may determine that a data volume of the measurement data for the sensor E is reducible at time T1. On the other hand, when focusing on time T13, because the measurement value=50.43, and the prediction value=1.8×10.7=19.26, the prediction error obtained by dividing the prediction value by the measurement value is 0.38191 . . . , which is outside the allowable range. Therefore, the determining section 170 may determine that a data volume of the measurement data for the sensor E at time T13 is not reducible. In this way, the determining section 170 may determine that data volumes of the measurement data for the sensor E from time T1 to time T12 is reducible, for example.

If it is determined that a data volume is not reducible for any measurement data (i.e., No) in step S360, the data recording apparatus 100 causes the processing to return step S320 and continues the processing flow. That is, the data recording apparatus 100 omits the processing of step S370. In this case, the determining section 170 supplies the data volume reducing section 180 with the multiple sets of measurement data together with a result indicating a fact that a data volume is not reducible for any measurement data. Then, the data volume reducing section 180 supplies the data compressing section 120 with the multiple sets of measurement data as they are without reducing data volumes for any of the measurement data.

On the other hand, if it is determined that a data volume is reducible for some measurement data (i.e., Yes) in step S360, the determining section 170 supplies the data volume reducing section 180 with the multiple sets of measurement data together with information specifying the measurement data of which data volume is reducible (for example, information specifying a sensor and/or time). Then, the data recording apparatus 100 causes the processing to proceed to step S370.

In step S370, the data recording apparatus 100 reduces the data volume of the measurement data. For example, the data volume reducing section 180 reduces, depending on the result obtained by the determining in step S360, a data volume for the measurement data of which data volume has been determined as being reducible.

By way of example, assuming that it is determined that data volumes for the measurement data of the sensor C are reducible from time T4 to time T10. In this case, the data volume reducing section 180 may thin a number of samples of the time series data "12, 12, 12, 13, 12, 12, 12" being the measurement data of the sensor C from time T4 to time T10 by one-half in the time axial direction, and thereby obtain a data sequence '12, 12, 12, 12'. In this way, the data volume reducing section 180 may reduce a number of samples per unit time for the measurement data of which data volume has been determined as being reducible, for example.

Assuming that it has been determined that data volumes of the measurement data for the sensor E are reducible from time T1 to time T12. In this case, the data volume reducing section 180 may round time series data '13.88, 13.92, 13.92, 13.92, 13.93, 13.88, 13.89, 13.89, 15.03, 19.29, 19.31, 19.34' being the measurement data of the sensor E from time T1 to time T12 off to the second decimal place, and obtain a data sequence '13.9, 13.9, 13.9, 13.9, 13.9, 13.9, 13.9, 13.9, 15.0, 19.3, 19.3, 19.3'. Note that, described above is one example of a case in which the data volume reducing section 180 uses the rounding. However, a method different from the rounding, such as rounding down or rounding up can also be used. Alternatively, the data volume reducing section 180 may reduce a data volume of the measurement data by reducing a number of bits (for example, reduce from 16 bits to 8 bits) used for quantizing each piece of measurement data having any dynamic range in time series. In this way, the data volume reducing section 180 may reduce a data size per piece of data for the measurement data of which data volume has been determined as being reducible, for example.

That is, the data volume reducing section 180 can reduce at least one of the number of samples per unit time or a data size per piece of data, for the measurement data of which data volume has been determined as being reducible. Note that, if a part of the data is reduced in this way, the data will never be restored completely. In other words, it can be said that the data volume reducing section 180 performs irreversible compression (i.e., lossy compression) on the measurement data.

Then, the data volume reducing section 180 supplies the data compressing section 120 with the measurement data of which data volume is reduced. On the other hand, for the measurement data of which data volume is determined as not being reducible, the data volume reducing section 180 supplies the data compressing section 120 with the measurement data as it is without reducing its data volume. Then, the data recording apparatus 100 causes the processing to return step S320.

In step S320 following step S370, the data recording apparatus 100 recompress measurement data. For example, the data compressing section 120 compresses multiple sets of measurement data including the measurement data of which data volume has been reduced in step S370.

By way of example, the data compressing section 120 may perform Run Length Encoding on a data sequence '12, 12, 12, 12' obtained by having reduced a data volume of time series data being the measurement data of the sensor C from time T4 to time T10, and obtain compressed data '"12"4'.

Similarly, the data compressing section 120 may perform Run Length Encoding on a data sequence '13.9, 13.9, 13.9, 13.9, 13.9, 13.9, 13.9, 13.9, 15.0, 19.3, 19.3, 19.3' obtained by having reduced a data volume of time series data being the measurement data of the sensor E from time T1 to time T12, and obtain compressed data '"13.9"8, "15.0", "19.3"3'. In this way, the data compressing section 120 compresses multiple sets of measurement data including the measurement data of which data volume has been reduced in step S370, for example. Then, the data compressing section 120 supplies the data recording section 130 with the compressed multiple sets of measurement data.

In this way, in step S330, the data recording section 130 records the multiple sets of measurement data compressed In step S320, for example. By way of example, the data recording section 130 thins a number of samples of the compressed data '"12"3, "13", "12"3' of the sensor C from time T4 to time T10 by one-half in the time axial direction, and overwrites this compressed data into '"12"4'. Similarly, the data recording section 130 overwrites the compressed data '"13.88", "13.92"3, "13.93", "13.88", "13.89"2, "15.03", "19.29", "19.31", "19.34"' of the sensor E from time T1 to time T12 into '"13.9"8, "15.0", "19.3"3'. In this manner, the data recording apparatus 100 can increase a remaining recordable capacity (i.e., amount of space) of the measurement data. The data recording apparatus 100 repeats such processing from step S320 to step S370, until it is judged that there is no trigger (No) in step S340.

If it is judged that there is no trigger (No) in step S340, the data recording apparatus 100 causes the processing to proceed to step S380.

In step S380, the data recording apparatus 100 judges whether to end the processing flow. If it is judged not to end the processing flow (No), then the data recording apparatus 100 causes the processing to return step S340 and continues the processing flow. On the other hand, if it is judged to end the processing flow (Yes), then the data recording apparatus 100 ends this processing flow.

Note that, shown in the processing flow described above is one example of a case in which the data recording apparatus 100 determines for every measurement data whether a data volume is reducible after decompressing the measurement data. However, measurement data can also be decompressed after it is determined for every measurement data whether a data volume is reducible. In this case, the data recording apparatus 100 may only decompress the measurement data of which data volume has been determined as being reducible, after determining for the every measurement data whether a data volume is reducible. In this manner, the data recording apparatus 100 may prevent decompression/compression processing from unnecessarily performed on measurement data of which data volume is not reducible.

For example, it is expected for a data volume to explosively increase in a situation where a process control system in the Operational Technology (OT) region is coupled to a system in the Information Technology (IT) region, or the like. In such a situation, it is not practical to record all of the data as it is, and thus it is necessary to reduce the data volume or sort out the data. Here, in recording measurement data, it is considered to perform compression after reducing a data volume of the measurement data. Conventionally, even when recording multiple sets of measurement data, each of which having a recording priority level different from another, all of the measurement data are collectively treated as a target for reducing its data volume. Despite that, depending on the measurement data, there may be data with a data volume on which the reduction processing to serve as irreversible processing is not preferred to be performed. However, with the conventional technique, it is impossible to flexibly handle such a request for every data.

In contrast to this, the data recording apparatus 100 according to the present embodiment determines for every measurement data whether a data volume is reducible, and reduces a data volume for measurement data of which data volume has been determined as being reducible, and compresses multiple sets of measurement data including this measurement data. In this manner, the data recording apparatus 100 according to the present embodiment can limit its target to measurement data of which data volume is reducible, and perform the data volume reduction processing on this measurement data. Therefore, the data recording apparatus 100 according to the present embodiment can record measurement data while selectively performing different processing for every measurement data, e.g., recording measurement data having high recording priority as completely restorable data on which no irreversible processing is performed, while recording measurement data having low recording priority as data on which irreversible processing has been performed and thus having a reduced data volume.

At this time, the data recording apparatus 100 according to the present embodiment may determine for every measurement data whether a data volume is reducible in accordance with the identification information representing whether the data volume is reducible. In this manner, the data recording apparatus 100 according to the present embodiment can determine for every measurement data whether a data volume is reducible in accordance with a clear instruction through a user input etc.

In addition, the data recording apparatus 100 according to the present embodiment may determine for every measurement data whether a data volume is reducible based on time at which a measurement target is measured. In this manner, the data recording apparatus 100 according to the present embodiment can voluntarily determine for every measurement data whether a data volume is reducible even without a clear instruction, based on time at which the measurement target is measured. This is useful especially when it is already known that measurement data in a predetermined period has low recording priority, e.g., measurement data in a certain period from when a measurement target is activated is not needed, for example.

In addition, the data recording apparatus 100 according to the present embodiment may determine for every measurement data whether a data volume is reducible, based on a changed amount in time series. In this manner, the data recording apparatus 100 according to the present embodiment can voluntarily determine for every measurement data whether a data volume is reducible even without a clear instruction, based on the changed amount in time series. This is useful especially when a number of states, or variation in measurement values of a measurement target shown by measurement data is small, for example.

In addition, the data recording apparatus 100 according to the present embodiment may determine for every measurement data whether a data volume is reducible, based on a prediction error obtained by predicting target measurement data by using another measurement data. In this manner, the data recording apparatus 100 according to the present embodiment can voluntarily determine for every measurement data whether a data volume is reducible even without a clear instruction, based on the prediction error. This is especially useful when there is a strong correlation between another measurement data and a target measurement data, for example.

The data recording apparatus 100 according to the present embodiment may also judge if there is a trigger for starting data volume reduction processing. In this manner, the data recording apparatus 100 according to the present embodiment can start the data volume reduction processing for the first time when a trigger is set in response to an instruction from an outside, passage of time, reduction in a capacity, etc.

In addition, the data recording apparatus 100 according to the present embodiment may reduce at least one of a number of samples per unit time or a data size per piece of data, for the measurement data of which data volume has been determined as being reducible. In this manner, the data recording apparatus 100 according to the present embodiment can selectively reduce a part of the measurement data in either of a time axial direction or a size axial direction, depending on a characteristic of the measurement data.

In addition, the data recording apparatus 100 according to the present embodiment may compress multiple sets of measurement data including measurement data of which data volume has been reduced, in a reversible way. In this manner, the data recording apparatus 100 according to the present embodiment can increase a probability for measurement data being a compression target to have a sequence of the same values by performing processing of reducing a data volume before processing of compressing the measurement data, and thereby increase compression efficiency in the following compression processing. Such a combination of the lossy compression and the lossless compression of data is especially useful in such a plant where fluctuation of measurement data is small because of the plant operating normally most of the time, and where the fluctuation of the measurement data becomes large in a rare event of an abnormality.

Figure 4:
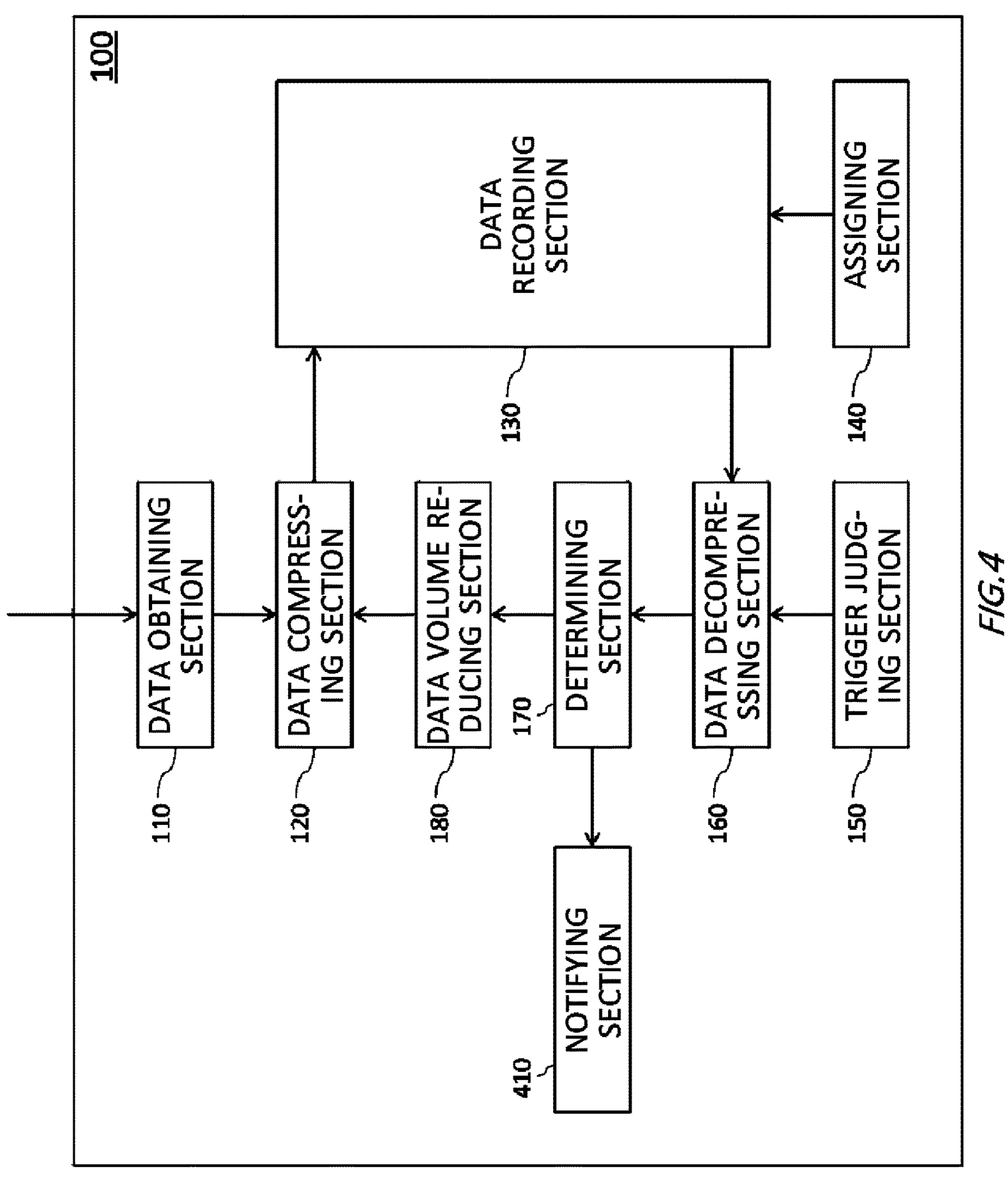
FIG. 4 illustrates one example of a block diagram of a data recording apparatus 100 according to a modification example of the present embodiment.

FIG. 4 illustrates one example of a block diagram of a data recording apparatus 100 according to a modification example of the present embodiment. In FIG. 4, a component having the same function and structure as that in FIG. 1 is attached with the same reference numeral used in FIG. 1, and description thereof will be omitted except the following points of differences. In the modified example, the data recording apparatus 100 further includes, when there is no measurement data of which data volume is reducible, a function of notifying of this fact. The data recording apparatus 100 according to the modified example further includes a notifying section 410 in addition to the functional sections included in the data recording apparatus 100 according to the embodiment described above. In the data recording apparatus 100 according to the modified example, when a determining section 170 determines that there is no measurement data of which data volume is reducible, the determining section 170 instructs the notifying section 410 on an action.

In response to the instruction from the determining section 170, the notifying section 410 provides an alert notice. In this manner, the notifying section 410 provides the alert notice when there is no measurement data of which data volume is reducible. At this time, the notifying section 410 may output that fact that there is no measurement data of which data volume is reducible by displaying it on a monitor, by voice sound through a speaker, by printing it using a printer, or by transmitting a message to another apparatus.

In this way, the data recording apparatus 100 according to the modified example provides an alert notice when there is no measurement data of which data volume is reducible. In this manner, the data recording apparatus 100 according to the modified example can let a user know a fact that that there is no measurement data of which data volume is reducible. Therefore, the user can acknowledge the fact that no more volume of measurement data to be recorded can be reduced under a setting at this point of time. In this manner, when the user wants to further reduce a data volume, the data recording apparatus 100 according to the modified example can recommend the user to additionally assign identification information representing that a data volume is reducible, or reset a threshold value for determining whether a data volume is reducible in the determining section 170. Therefore, in response to the data recording apparatus 100 having provided the alert notice, the data recording apparatus 100 may change its mode to a mode in which the identification information can additionally assigned, or a mode in which the threshold value can be reset, and start receiving a user input.

Figure 5:
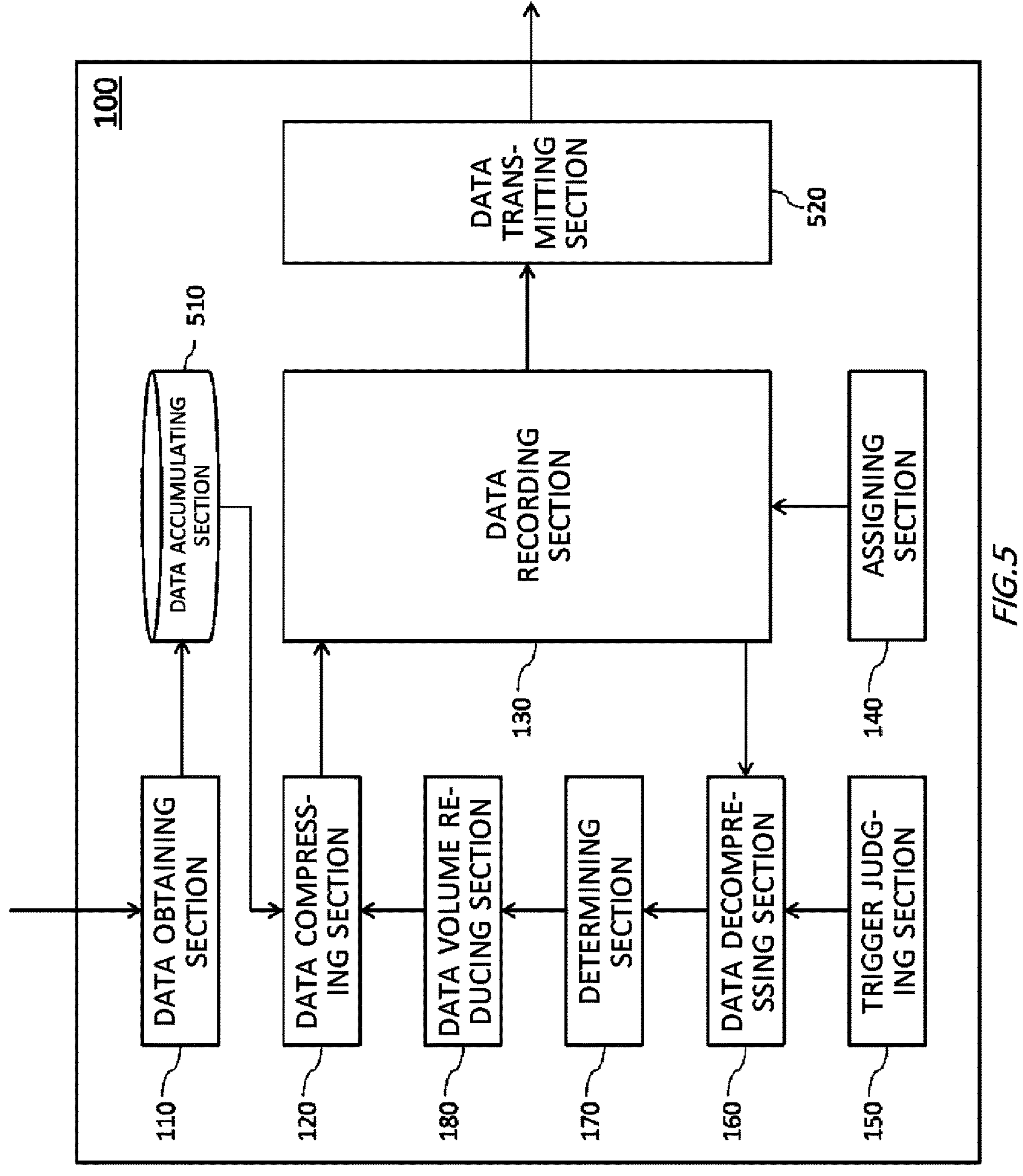
FIG. 5 illustrates one example of a block diagram of a data recording apparatus 100 according to another modification example of the present embodiment.

FIG. 5 illustrates one example of a block diagram of a data recording apparatus 100 according to another modification example of the present embodiment. In FIG. 5, a component having the same function and structure as that in FIG. 1 is attached with the same reference numeral used in FIG. 1, and description thereof will be omitted except the following points of differences. The data recording apparatus 100 according to the modified example may be provided in an OT region for example, and may be able to transmit at least a part of multiple sets of measurement data obtained from a sensor provided in the OT region to another apparatus provided in an IT region. The data recording apparatus 100 according to the modified example further include a data accumulating section 510, and a data transmitting section 520 in addition to the functional sections included in the data recording apparatus 100 according to the embodiments described above. In the data recording apparatus 100 according to the modified example, a data obtaining section 110 supplies the obtained multiple sets of measurement data to the data accumulating section 510 instead of a data compressing section 120.

The data accumulating section 510 accumulates the multiple sets of measurement data. For example, the data accumulating section 510 may accumulate the multiple sets of measurement data obtained by the data obtaining section 110 in time series for every sensor. Then, the data accumulating section 510 supplies the data compressing section 120 with transmission target measurement data that should be transmitted to another apparatus among the multiple sets of accumulated measurement data. Such a transmission target may be selected based on a user input, or selected automatically by the data recording apparatus 100, for example.

In the data recording apparatus 100 according to the modified example, the data compressing section 120 compresses the transmission target measurement data among the multiple sets of measurement data obtained, and then a data recording section 130 records this compressed data.

The data transmitting section 520 transmits the measurement data recorded in the data recording section 130, that is, the transmission target measurement data among the multiple sets of measurement data, to another apparatus via a communication network, for example.

Here, it can be said that the measurement data which has previously transmitted to another apparatus has low recording priority in the data recording apparatus 100. Therefore, in the data recording apparatus 100 according to the modified example, the determining section 170 may determine for every measurement data whether a data volume is reducible based on a transmission history of transmitting by the data transmitting section 520 to another apparatus. By way of example, assuming that the data transmitting section 520 has transmitted measurement data of a sensor A, a sensor B, and a sensor C from time T1 to time T9 to another apparatus. In this case, the determining section 170 may determine that data volumes of the measurement data for the sensors A, B, and C from time T1 to time T9 are reducible.

In this way, the data recording apparatus 100 according to the modified example may determine for every measurement data whether a data volume is reducible based on the transmission history of transmission to another apparatus. In this manner, the data recording apparatus 100 according to the modified example can voluntarily determine for every measurement data whether a data volume is reducible even without a clear instruction, based on the transmission history of transmission to the another apparatus. This is useful especially when transmitting measurement data to an external apparatus for analysis or machine learning of a measurement target, for example.

In addition, in the data recording apparatus 100 according to the modified example, the data transmitting section 520 can transmit to another apparatus measurement data obtained by performing processing of decompression, determination on whether being reducible, reduction of a data volume, and compression on transmission target measurement data. In this manner, the data recording apparatus 100 according to the modified example can reduce a data volume to be transmitted from the data recording apparatus 100 when transmitting measurement data from the OT region to the IT region, for example.

Various embodiments of the present invention may be described with reference to flowcharts and block diagrams whose blocks may represent (1) stages of processes in which operations are performed or (2) sections of an apparatus for performing operations. Certain stages and sections may be implemented by a dedicated circuit, a programmable circuit supplied with a computer-readable instruction stored on a computer readable medium, and/or a processor supplied with a computer-readable instruction stored on a computer readable medium. The dedicated circuit may include a digital and/or analog hardware circuit, and may include an integrated circuit (IC) and/or a discrete circuit. The programmable circuit may include a reconfigurable hardware circuit including logical AND, logical OR, logical XOR, logical NAND, logical NOR, and other logical operations, a memory element etc. such as a flip-flop, a register, a field programmable gate array (FPGA) and a programmable logic array (PLA), and the like.

The computer readable medium may include any tangible device that can store instructions to be executed by a suitable device, and as a result, the computer readable medium having instructions stored thereon includes an article of manufacture including instructions which can be executed in order to create means for performing operations specified in the flowcharts or block diagrams. An example of the computer readable medium may include an electronic storage medium, a magnetic storage medium, an optical storage medium, an electromagnetic storage medium, a semiconductor storage medium, or the like. More specific example of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, or the like.

The computer-readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

The computer-readable instruction may be provided to a processor of a general-purpose computer, special purpose computer, or other programmable data processing apparatuses, or to a programmable circuit, locally or via a local area network (LAN), wide area network (WAN) such as the Internet, or the like, to execute the computer-readable instructions in order to create means for performing operations specified in the flowcharts or block diagrams. An example of the processor includes a computer processor, a processing unit, a microprocessor, a digital signal processor, a controller, a microcontroller, or the like.

Figure 6:
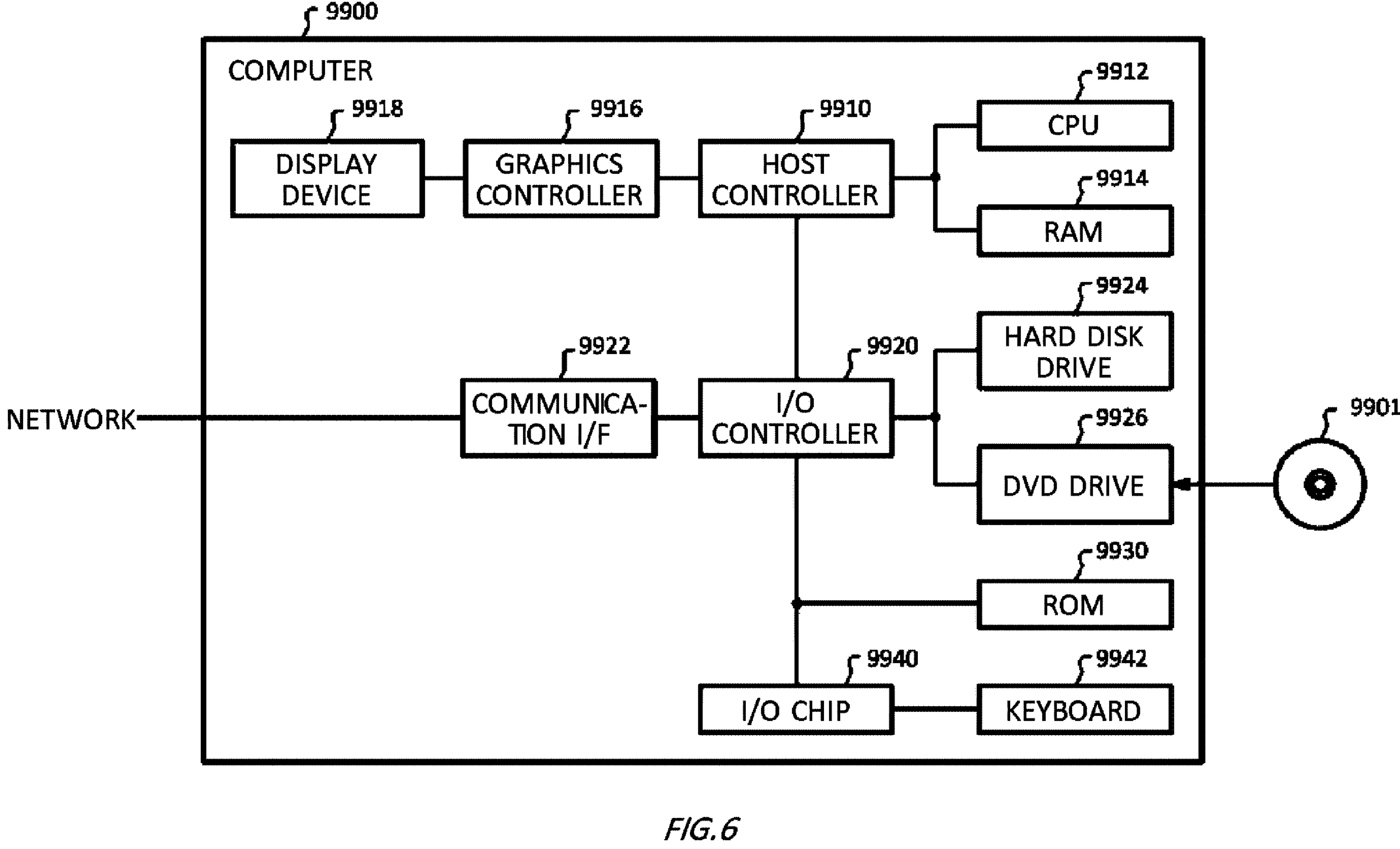
FIG. 6 illustrates an example of a computer 9900 in which a plurality of aspects of the present invention may be entirely or partially embodied.

FIG. 6 illustrates an example of a computer 9900 through which a plurality of aspects of the present invention may be entirely or partially embodied. A program that is installed in the computer 9900 can cause the computer 9900 to function as operations associated with the apparatus according to the embodiment of the present invention or one or more sections of this apparatus, or can cause the computer 9900 to execute these operations or this one or more sections, and/or can cause the computer 9900 to execute a process or a stage of this process of the embodiment according to the present invention. Such a program may be executed by a CPU 9912 so as to cause the computer 9900 to execute certain operations associated with some or all of the flowcharts and the blocks in the block diagrams described herein.

The computer 9900 according to the present embodiment includes the CPU 9912, a RAM 9914, a graphics controller 9916 and a display device 9918, which are mutually connected by a host controller 9910. The computer 9900 further includes input/output units such as a communication interface 9922, a hard disk drive 9924, a DVD drive 9926 and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphics controller 9916 obtains image data generated by the CPU 9912 on a frame buffer or the like provided in the RAM 9914 or in itself, and to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads programs or data from a DVD-ROM 9901, and to provide the hard disk drive 9924 with the programs or data via the RAM 9914. The IC card drive reads the programs and the data from the IC card, and/or writes the programs and the data to the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port or the like to the input/output controller 9920.

A program is provided by a computer readable medium such as the DVD-ROM 9901 or the IC card. The program is read from the computer readable medium, installed into the hard disk drive 9924, RAM 9914, or ROM 9930, each of which is an example of a computer readable medium, and executed by CPU 9912. The information processing written in these programs is read into the computer 9900, and thus cooperation between the programs and the above-described various types of hardware resources is provided. An apparatus or method may be constituted by performing the operations or processing of information in accordance with the use of the computer 9900.

For example, when communication is performed between the computer 9900 and an external device, the CPU 9912 may execute a communication program loaded onto the RAM 9914 to instruct communication processing to the communication interface 9922, based on the processing written in the communication program. The communication interface 9922, under control of the CPU 9912, reads transmission data stored on a transmission buffer processing region provided in a recording medium such as the RAM 9914, the hard disk drive 9924, DVD-ROM 9901, or the IC card, and transmits the read transmission data to a network or writes reception data received from a network to a reception buffer processing region or the like provided on the recording medium.

Also the CPU 9912 may cause all or a necessary portion of a file or a database to be read into the RAM 9914, of which file or the database has been stored in an external recording medium such as the hard disk drive 9924, the DVD drive 9926 (DVD-ROM 9901), the IC card, etc., and perform various types of processing on the data on the RAM 9914. The CPU 9912 then writes back the processed data to the external recording medium.

Various types of information such as various types of programs, data, tables, and databases may be stored in a recording medium and subjected to information processing. The CPU 9912 may perform various types of processing on the data read from the RAM 9914, which includes various types of operations, information processing, conditional judging, conditional branch, unconditional branch, search/replacement of information, etc., as described throughout this disclosure and specified by an instruction sequence of programs, and writes the result back to the RAM 9914. Also the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry whose attribute value of the first attribute matches a specified condition, from among this plurality of entries, and read the attribute value of the second attribute stored in this entry, thereby obtaining the attribute value of the second attribute associated with the first attribute satisfying the predetermined condition.

The above described program or software modules may be stored in the computer readable medium on or near the computer 9900. Also a recording medium such as a hard disk or a RAM provided in a server system connected to a dedicated communication network or the Internet can be used as the computer readable medium, thereby providing the program to the computer 9900 via the network.

While the present invention has been described with the embodiments, the technical scope of the present invention is not limited to the above-described embodiments. It is apparent to persons skilled in the art that various alterations or improvements can be added to the above-described embodiments. It is also apparent from the description of the claims that the embodiments to which such alterations or improvements are made can be included in the technical scope of the present invention.

It should be noted that the operations, procedures, steps, stages, etc. of each process performed by an apparatus, system, program, and method shown in the claims, specification, or drawings can be performed in any order as long as the order is not clearly indicated by “prior to”, “before”, or the like and as long as the output from a previous process is not used in a later process. Even if the operation flow is described using phrases such as "first" or "next" in the claims, specification, or drawings, it does not necessarily mean that the process must be performed in this order.

EXPLANATION OF REFERENCES

100: data recording apparatus; 110: data obtaining section; 120: data compressing section; 130: data recording section; 140: assigning section; 150: trigger judging section; 160: data decompressing section; 170: determining section; 180: data volume reducing section; 410: notifying section; 510: data accumulating section; 520: data transmitting section; 9900: computer; 9901: DVD-ROM; 9910: host controller; 9912: CPU; 9914: RAM; 9916: graphics controller; 9918: display device; 9920: input/output controller; 9922: communication interface; 9924: hard disk drive; 9926: DVD drive; 9930: ROM; 9940: input/output chip; 9942: keyboard.

What is claimed is:

1. A data recording apparatus, comprising:

a data obtaining section for obtaining multiple sets of measurement data obtained by measuring a measurement target;

a determining section for determining for every measurement data of the multiple sets of measurement data whether a data volume is capable of being irreversibly compressed;

an irreversible data volume reducing section for irreversibly compressing, in response to a result of the determining, the data volume for measurement data of which data volume has been determined as being capable of being irreversibly compressed;

a reversible data compressing section for reversibly compressing multiple sets of measurement data including the measurement data of which the data volume has been irreversibly compressed; and a data recording section for recording the multiple sets of measurement data which have been irreversibly compressed and reversibly compressed.

2. The data recording apparatus according to claim 1, further comprising an assigning section for assigning identification information representing whether the data volume is capable of being irreversibly compressed to every measurement data of the multiple sets of measurement data, wherein the determining section is configured to determine for every measurement data whether the data volume is capable of being irreversibly compressed in accordance with the identification information.

3. The data recording apparatus according to claim 2, wherein the assigning section is configured to assign the identification information to every measurement data in response to a user input.

4. The data recording apparatus according to claim 2, further comprising a trigger judging section for judging if there is a trigger for starting irreversible data volume reduction processing on the multiple sets of measurement data.

5. The data recording apparatus according to claim 2, wherein the irreversible data volume reducing section is configured to irreversibly compress at least one of a number of at least one sample per unit time or a data size per piece of data, for measurement data of which the data volume has been determined as capable of being irreversibly compressed.

6. The data recording apparatus according to claim 1, wherein the determining section is configured to determine for every measurement data whether the data volume is capable of being irreversibly compressed based on time at which the measurement target is measured.

7. The data recording apparatus according to claim 1, wherein the determining section is configured to determine for every measurement data whether the data volume is capable of being irreversibly compressed based on a changed amount in time series.

8. The data recording apparatus according to claim 1, wherein the determining section is configured to determine for every measurement data whether the data volume is capable of being irreversibly compressed based on a prediction error obtained by predicting target measurement data by using another measurement data.

9. The data recording apparatus according to claim 1, further comprising a trigger judging section for judging if there is a trigger for starting irreversible data volume reduction processing on the multiple sets of measurement data.

10. The data recording apparatus according to claim 9, wherein the trigger is set in response to an instruction from an outside.

11. The data recording apparatus according to claim 9, wherein the trigger is set in response to a fact that a predetermined time has passed.

12. The data recording apparatus according to claim 9, wherein the trigger is set in response to a fact that a remaining recordable capacity does not satisfy a predetermined criteria.

13. The data recording apparatus according to claim 1, wherein the irreversible data volume reducing section is configured to irreversibly compress at least one of a number of at least one sample per unit time or a data size per piece of data, for measurement data of which the data volume has been determined as capable of being irreversibly compressed.

14. The data recording apparatus according to claim 1, further comprising a notifying section for providing an alert notice when there is no measurement data of which the data volume is capable of being irreversibly compressed.

15. The data recording apparatus according to claim 1, further comprising a data transmitting section for transmitting transmission target measurement data among the multiple sets of measurement data to another apparatus.

16. The data recording apparatus according to claim 15, wherein the determining section is configured to determine for every measurement data whether the data volume is capable of being irreversibly compressed based on a transmission history of transmission to the another apparatus.

17. A data recording method executed by a computer, comprising the computer to perform operations including:

obtaining multiple sets of measurement data obtained by measuring a measurement target;

determining for every measurement data of the multiple sets of measurement data whether a data volume is capable of being irreversibly compressed;

irreversibly compressing, in response to a result of the determining, the data volume for measurement data of which the data volume has been determined as capable of being irreversibly compressed;

reversibly compressing multiple sets of measurement data including the measurement data of which the data volume has been irreversibly compressed; and recording the multiple sets of measurement data which have been irreversibly compressed and reversibly compressed.

18. A non-transitory computer readable medium having recorded thereon a data recording program that, when executed by a computer, causes the computer to function as:

a data obtaining section for obtaining multiple sets of measurement data obtained by measuring a measurement target;

a determining section for determining for every measurement data of the multiple sets of measurement data whether a data volume is capable of being irreversibly compressed;

an irreversible data volume reducing section for irreversibly compressing, in response to a result of the determining, the data volume for measurement data of which the data volume has been determined as capable of being irreversibly compressed;

a reversible data compressing section for reversibly compressing multiple sets of measurement data including the measurement data of which the data volume has been irreversibly compressed; and a data recording section for recording the multiple sets of measurement data which have been irreversibly compressed and reversibly compressed.

* * * * *